Patented July 30, 1929.

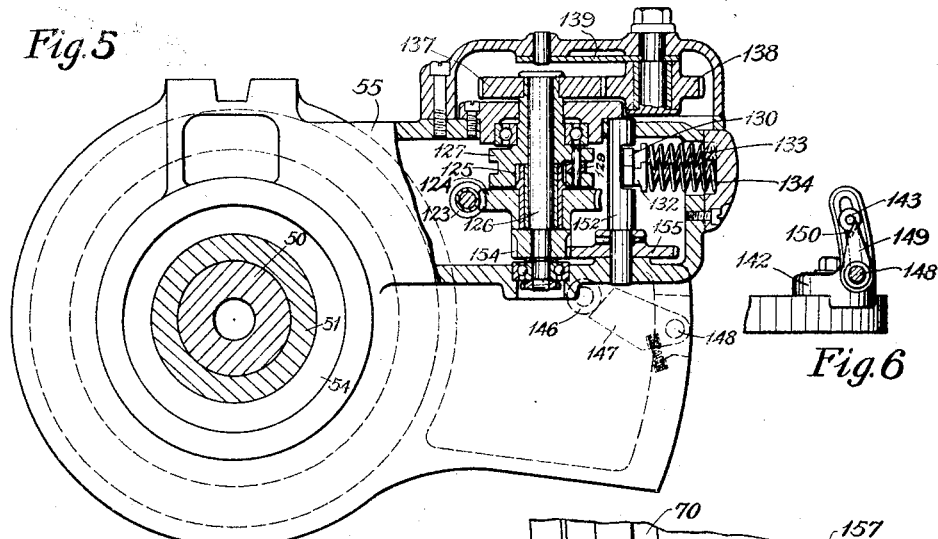

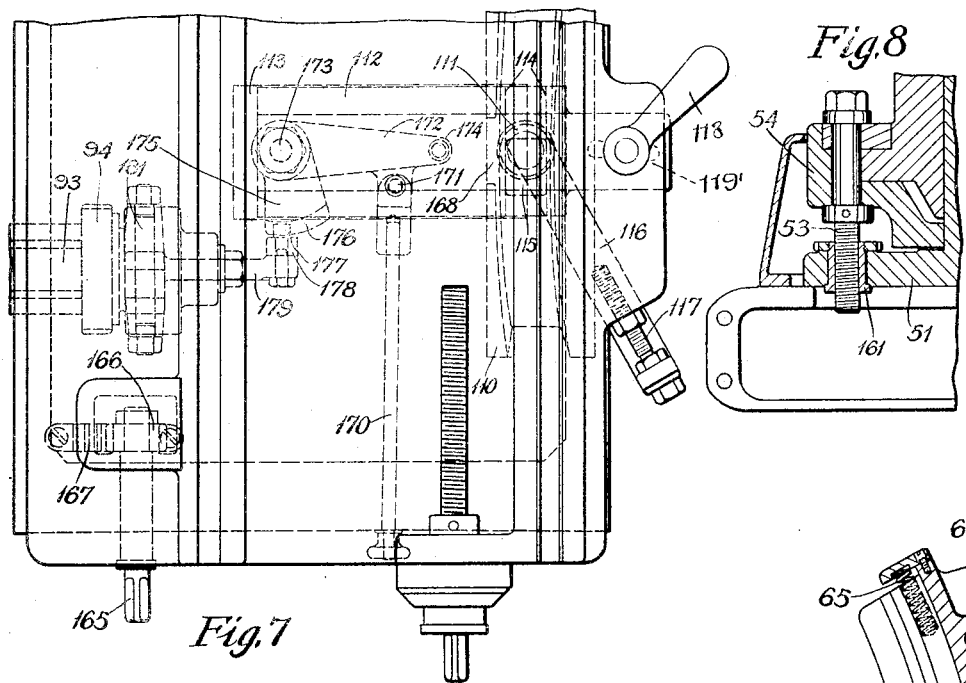
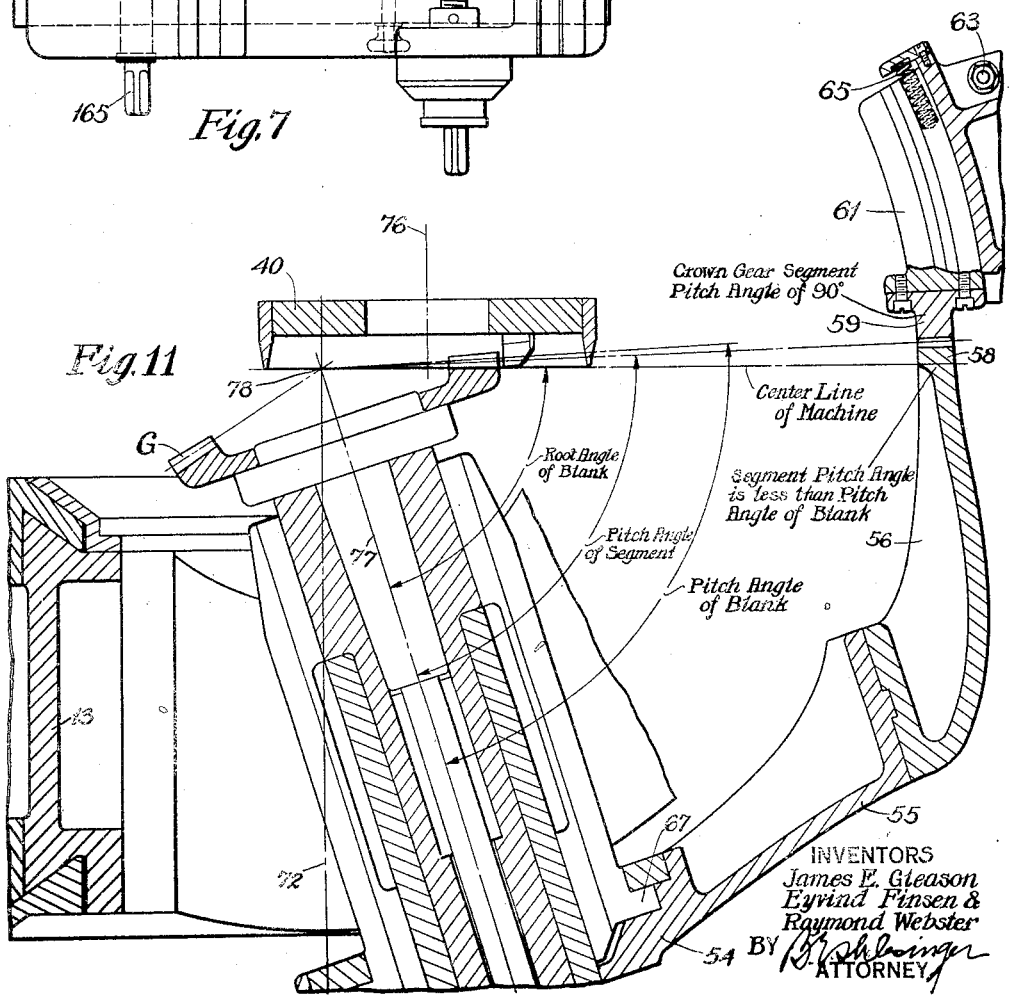

1,722,464

UNITED STATES PATENT OFFICE.

JAMES E. GLEASON, EYVIND FINSEN, AND RAYMOND WEBSTER, OF ROCHESTER, NEW YORK, ASSIGNORS TO GLEASON WORKS, OF ROCHESTER, NEW YORK, A CORPORATION OF NEW YORK.

METHOD OF AND MACHINE FOR GENERATING GEARS.

Application filed September 20, 1927. Serial No. 220,785.

The present invention relates to a method of and machine for cutting gears and particularly to a method of and machine for producing bevel gears by the generating process, namely, the process in which a relative rolling motion is effected between the gear blank and the tool during the cutting motion of the tool to generate the tooth profiles. More specifically, the present invention relates to a method and machine for generating longitudinally curved tooth bevel gears with a rotary annular face mill cutter.

A primary object of this invention is to provide a machine of the character described having a simplified construction and operating with a minimum of parts and which can therefore be produced at a decreased cost while possessing the rigidity and durability which permits of fast production.

A further object of this invention is to provide a machine which can be employed for generating various sizes and tooth members of gears correctly with a minimum change of parts.

A still further object of this invention is to provide a method for generating gears which will require a minimum of adjustment of the tool or tools so as to obtain a proper bearing between the teeth of the two members of a pair.

A further object is to provide mechanism for imparting periodically an indexing motion to the blank which will be simple in operation, which will permit elimination of the complicated drives heretofore employed, and which will be universal in character, that is, will be capable of indexing gears of various tooth numbers.

Other objects of the invention will be apparent hereinafter from the specification, when read in conjunction with the accompanying drawings, the novel features being pointed out in the claims appended hereto.

In the drawings:

Figure 4 is a sectional view of the work head showing the mechanism for effecting the indexing movement of the blank;

Figure 5 is a section on the line 5—5 of Figure 4;

Figure 6 is a detail showing the pin and lever for tripping the index mechanism;

Figure 7 is a partial plan view of a portion of the frame or bed of the machine upon which the tool mechanism is mounted and showing the safety device for preventing complete relative withdrawal of the tool from the blank until the main drive has been disconnected;

Figure 8 is a partial sectional view showing a detail of the blank spindle adjustment;

Figure 9 is a detail of one of the parts of the mechanism for adjusting the tool carrier and tool for depth;

Figure 10 is a plan view of one of the yieldable sections of the crown gear segment;

Figure 11 is a diagrammatic view illustrating the method of imparting the correct generating motion to the gear blank in this invention; and Figure 12 is a perspective view of the parts employed in adjusting the tool carrier and tool for depth.

Figure 1:
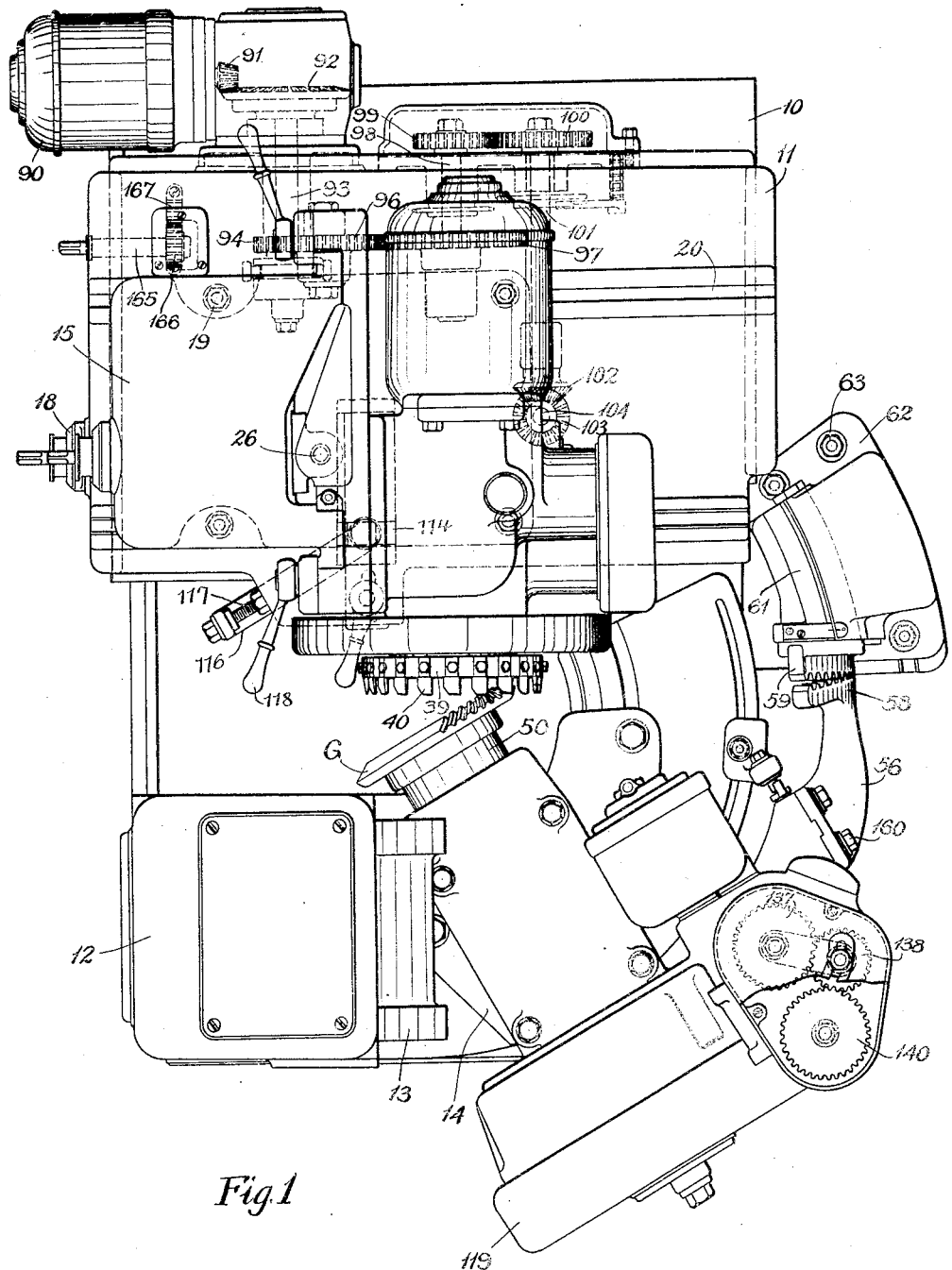
Fig. 1 is a plan view of a machine constructed according to one embodiment of this invention.

The present invention relates particularly to machines for generating bevel gears. In the mechanism illustrated, the relative generating or rolling movement is produced by a gear segment fixed to the blank support and rolling on a second gear segment.

To correctly generate both members of a pair of bevel gears, the rolling motion imparted between the tool or tools and the blank should correspond to that of a gear rolling on a crown gear or the ratio of rotation of the work and the cradle should correspond to that of the gear to be cut when rolling with a crown gear. The use of gear segments for producing a relative rolling motion between the tool and blank is not new with this invention. Machines have been constructed, heretofore, in which gear segments were used for producing the relative roll, in which the segment connected to the blank had the same pitch angle as that of the blank and rolled on a crown gear segment, that is, a segment having a pitch angle of 90°. In machines of this construction, however, the gear blank had to be set with its pitch line coinciding with the center line of the machine which necessitated that the tools be angularly adjusted to a different position for each job so that the tool could travel on the root line of a tooth of the blank to cut teeth of full depth.

In the copending application of James E. Gleason et al., No. 624,962, filed March 14, 1923, now Patent No. 1,660,502 of February 28, 1928, a machine is described in which this angular adjustment is avoided. In this machine, the blank and tool are rolled relatively to each other by means of a bevel gear segment secured to the blank having a pitch angle less than that of the blank and rolling on a bevel gear segment having a pitch angle less than 90°. With this latter type of machine, the tools are set to the center line of the machine and all blanks to be cut are adjusted with the root line of a tooth coinciding with the center line of the machine. A machine of this latter type is, however, a single purpose machine and is suitable principally for large production where the machines are to be employed in producing continuously the same kind of gears, as both segments would have to be changed to cut gears of different pitch angles.

With the purpose of producing a machine capable of cutting gears of different pitch angles within a very wide range, machines have been built, also, in which the gear segment connected to the blank had the same pitch angle as that of the blank and rolled on a crown gear segment which was yieldably mounted, being pressed forward into position by a spring or equivalent mechanical element. The yieldable crown gear segment made it possible to adjust the tool to the center line of the machine and cut to full depth with the root line of a tooth of the blank on the center line. At the same time, the number of segments required for cutting gears of different pitch angles was reduced, since with a machine of this type it is only necessary to change the segment connected to the blank, when cutting a gear of a different pitch angle, the resilient mounting of the crown gear permitting the yielding movement necessary for the crown gear to accommodate itself to the different sizes of the segments connected to the blank.

While the last described type of machine has the advantage of being universal in character, that is, being suitable for cutting gears of various pitch angles, the correct ratio of roll between tool and blank cannot be obtained with segments such as employed thereon and, moreover, a considerable angular adjustment of the tools is required as regards pressure angle, to obtain the proper bearing between the gear and pinion teeth.

The system of the present invention differs from the methods previously practised in that the blank is rolled relative to the tool by means of a gear segment secured to the blank and having a pitch angle less than that of the blank and rolling on a crown gear segment which is mounted so as to be yieldable. By this arrangement, as is preferable, the blank can be set with the root line of a tooth on the center line of the machine and the tools can be mounted to always travel on this center line, and at the same time, by properly selecting the blank segments, a correct ratio of roll corresponding to that of the gear to be cut rolling with a crown gear can be obtained. A machine constructed according to this invention, is, moreover, universal in character as it is simply necessary to change the gear segment connected to the blank to cut a gear of any pitch angle. The system of this invention has the further advantage, also, of reducing to a minimum the adjustment required for the pressure angles of the tools to obtain proper bearing between the teeth of a mating gear and pinion.

In machines employing gear segments to produce the generating roll it has been customary to index the blank by means of a notched plate index mechanism, to avoid a complicated drive to the blank spindle for indexing. In machines employing a notched plate index, however, a different notched plate must be used with each change in the number of teeth of the gears to be cut upon the machine. These plates are expensive to make and require great care to obtain the accuracy desired. With the present invention, the index mechanism, including the source of power, is mounted wholly on the blank carrier and this indexing mechanism is of the universal or worm and worm wheel type. No complicated drive is required and the same worm and worm wheel are employed in cutting gears of all tooth numbers.

The present invention is illustrated in connection with a machine for producing longitudinally curved tooth or spiral bevel gears. It will be understood, however, that in certain aspects it is applicable to the production of other types of gears also and that while the tool shown is an annular face mill this invention is equally applicable to gear producing machinery involving other types of cutter mechanism, as reciprocating tools, and to the finishing of gears by grinding instead of cutting and that the term "cutting" or "cutter," as used in the specification and claims is intended to include a grinding operation.

Referring now to the drawings, by numerals of reference: 10 indicates the bed or frame of the machine. Upon this bed is slidably mounted the tool carrier 11 which is movable on the bed or frame 10 for the purpose of feeding the tool into engagement with the blank and of withdrawing the tool periodically from engagement for indexing the blank. The bed or frame 10 is provided at one end with an upright portion 12 which serves as a support for the oscillating cradle 13 upon which the blank head or carrier 14 is adjustably mounted.

Figure 2:
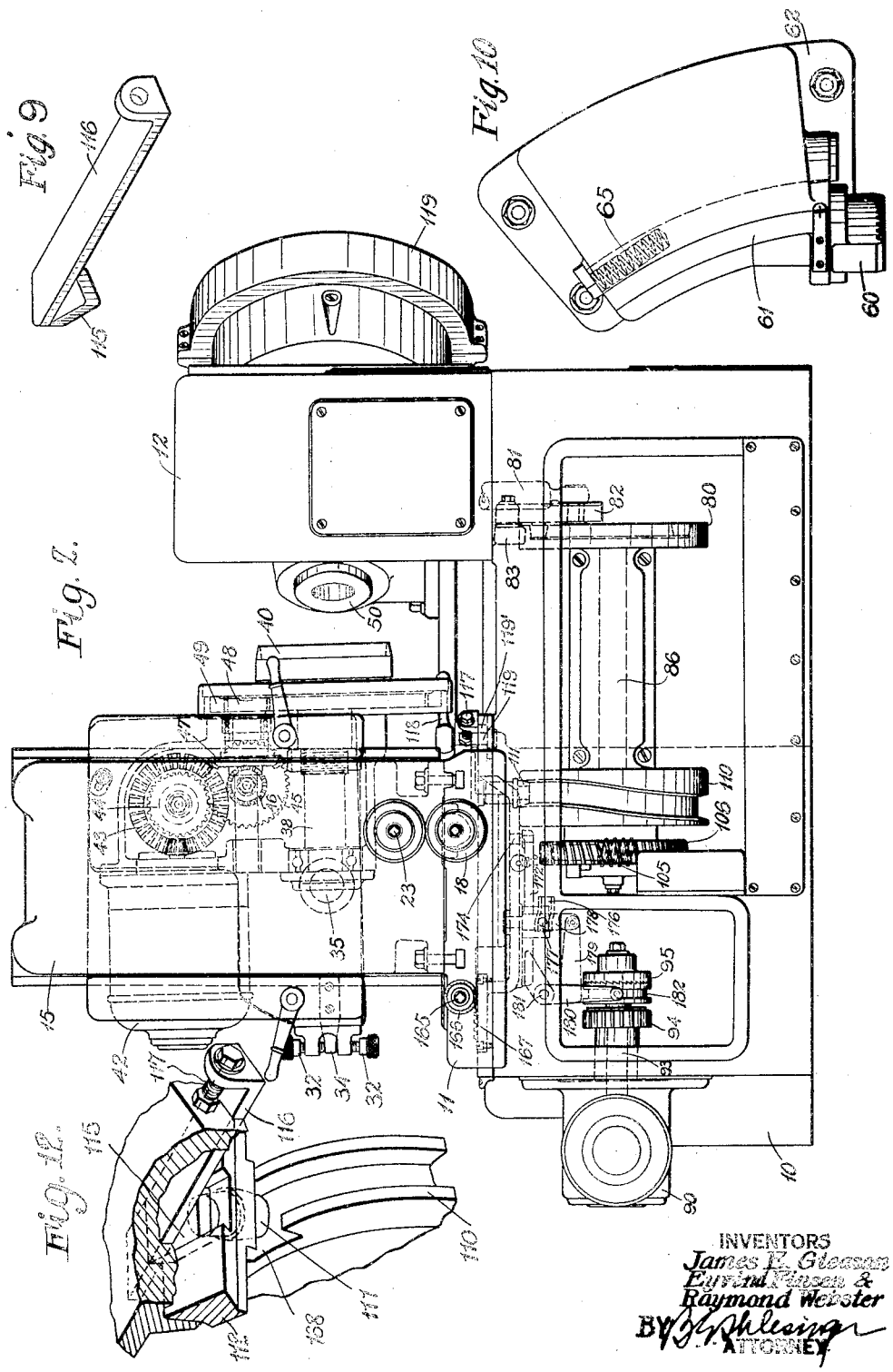
Fig. 2 is a side elevation of the machine.
Figure 3:
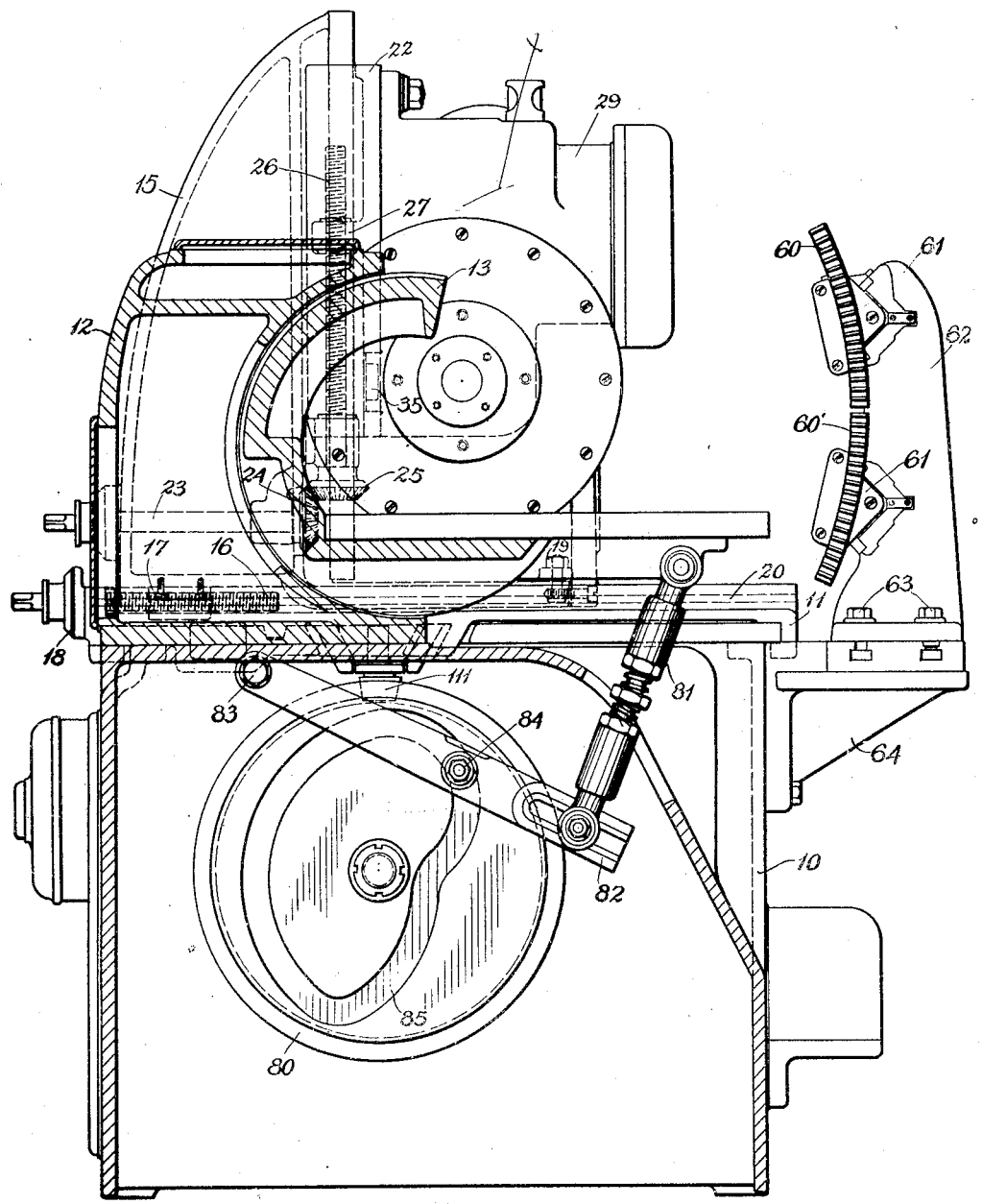
Figure 3 is a vertical sectional view of the machine.

The tool carrier 11 is slidable on ways provided on the bed or frame 10, as shown in Figures 1, 2 and 3. Slidably adjustable upon this carrier in a direction at right angles to the movement of the carrier itself is a standard or upright 15 which may be adjusted on the carrier 11 by means of the screw 16 and nut 17. An index dial 18 is provided for the purpose of enabling the adjustment to be accurately made. The standard 15 can be secured in any adjusted position upon the base or carrier 11 by means of the bolts 19 which are provided with T-heads which engage in the T-slots 20 formed in the base or carrier 11. The standard 15 serves as a support for the slide 22 which is adjustable upon the standard by rotating the shaft 23, the gears 24 and 25 and the screw 26 which threads into the nut 27 which is secured to or formed integral with the slide 22.

Mounted on the slide 22 for angular adjustment thereon is a saddle 29. The angular adjustment of the saddle 29 is effected by adjustment of the screws 32 which thread into lugs formed on the slide 22 and engage a finger 34 which is secured to the saddle 29. The angular adjustment of the saddle takes place about the stud 35 (Figs. 2 and 3) provided on the slide 22 and seating in a socket formed in the saddle.

Journaled in the saddle is the shaft 38 to which is secured the tool head 39 which carries the cutter blades forming the rotary annular face mill cutting tool 40. The tool is rotated continuously on its axis during the operation of the machine, being driven from the motor 42 mounted on the saddle 29 through the bevel gearing 43, the spur gears 44 and 45, the bevel gears 46 and 47, the spur pinion 48, and the internal spur gear 49, the latter gear being secured to the cutter head. All the gears of this train are mounted in the saddle.

The blank G to be cut is secured in any known or suitable manner to the blank spindle 50 which is rotatable relative to the sleeve 51. The sleeve 51 is secured by means of an adjusting screw 53 (Fig. 8) and a stud (not shown) to the cylindrical bearing portion 54 of the bracket arm 55 to which is bolted the arm 56 carrying the gear segment 58, and is journaled in suitable bearings in the blank head or carrier 14.

The segment 58 meshes with a relatively stationary crown gear segment 59 and rolls thereon during the operation of the machine. The crown gear segment 59 is made, preferably, in two sections 60 and 60' each of which is secured to a slide 61 which is slidable in guide ways formed on an upright 62 which can be adjustably secured by means of the bolts 63 to a bracket 64 which is fixed to the bed or frame of the machine. The slides 61 and the gear sections 60 and 60' mounted thereon are maintained in position by means of springs 65 (Figs. 10 and 11) which are interposed between the upright 62 and the slides 61 and which serve to permit yielding movement of the segment 59 as required when rolling with gear segments 58 of different pitch angles. The arm 55 which carries the gear segment 58 is guided in its rotary motion by the flange 67 provided on the blank head or carrier 14. This blank head or carrier 14 is angularly adjustable upon the face of the oscillatory cradle 13, for the purpose of setting the blank to the required root angle with reference to the center line of the machine. The blank head or carrier 14 can be secured in any adjusted position by means of the bolts 69 which engage in circular T-slots 70 formed in the face of the cradle 13.

The cradle, as previously described, oscillates in guideways formed in the upright 12. As will be evident, oscillation of the cradle 13 upon its axis 72 (Fig. 11) will cause the blank segment 58 to roll upon the stationary crown gear segment 59 thereby imparting a rolling movement to the blank and enabling the generation of the tooth profiles of the blank during the cutting operation.

The method by which a correct generating roll is obtained between the tool and blank is one of the novel features of this invention. With the present invention, the tip surface of the tool 40 is positioned in the plane of the center line of the machine shown in Figure 11 and no adjustment of the tool to the root line of the tooth is necessary, the tool always having the same position no matter what the pitch angle of the blank to be cut. The axis 76 of the tool is thus always parallel to the axis 72 of the cradle. The blank G is adjusted with the root line of a tooth on the center line of the machine, the blank axis 77 being inclined to and intersecting the cradle axis 72 in the gear apex 78. In order to secure a proper rolling motion between the tool and blank with the present system, a bevel gear segment 58 is employed having a pitch angle slightly less than that of the blank and this segment is rolled upon the yieldably mounted crown gear segment 59 whose pitch angle is 90°. By a correct determination of the pitch angle of the gear segment 58 the same relative rolling motion can be produced between tool and blank as would be obtained if the gear to be cut were rolling upon a true crown gear. The spring mounting of the crown gear segment maintains this segment in proper meshing relation with the bevel gear segment 58 and at the same time permits the crown gear segment to move sufficiently to assume the position required by the new method of generation. This principle of generation offers a method wherein only one segment, the bevel gear segment 58, need be changed when cutting a gear of a different pitch angle and a method in which, none-the-less, a correct ratio of roll corresponding to that of a gear rolling on a crown gear can be secured. Aside from the feature that no adjustment of the tool is required to align it with the root line of the tooth to be cut, it has been found that this system offers a further advantage that a minimum of pressure angle adjustment of the tool, such as may be effected by tilting the saddle 29 by the screws 32, is required in cutting mating gear and pinion so as to secure a proper bearing between the teeth of the pair.

The oscillation of the cradle required to produce the generating roll is effected from the cam 80 (Figs. 2 and 3). Pivotally secured to the cradle 13 is an adjustable connecting member 81 which has a pivotally connection with the free end of a lever 82 which is pivoted at 83 to the bed or frame of the machine and which carries intermediate its ends a roller 84 that engages in the cam slot 85 of the cam 80.

The cam 80 is secured to a cam shaft 86 which is journaled in the frame or bed of the machine and which is driven continuously in the same direction from the motor 90 (Figs. 1 and 2) through the bevel gears 91 and 92, the shaft 93, the spur gear 94 and the clutch 95 connecting said gear with the shaft 93, the spur gears 96 and 97, the shaft 98, the spur gears 99 and 100, the shaft 101, the bevel gears 102 and 103, the worm shaft 104 to which the bevel gear 103 is secured, the worm 105 mounted upon said shaft and the worm wheel 106 which meshes therewith and which is secured to the cam shaft 86.

During the cutting operation the tool rotates on its axis in engagement with the blank and the blank is rolled relative to the tool by oscillation of the cradle 13 through the mechanism described, this oscillatory movement causing the bevel gear segment 58 to roll upon the crown gear segment 59 and impart a rolling motion to the blank. After a tooth side or two adjacent tooth sides have been completely generated in this manner, the tool and blank are withdrawn relative to each other and the blank indexed, the tool and blank being again fed into engagement to cut the next tooth. In the present machine, the relative withdrawal and feed motion is effected by movement of the tool carrier on the bed or frame in a direction parallel to the axis of the cradle. This movement is produced by means of the cam 110 which is mounted upon the shaft 86 and rotates therewith and which engages the roller 111 which is mounted upon a slide 112 which is adjustable in a slot 113 formed in the carrier 11. The slide 112 is provided with a transverse slot indicated by the dotted lines 114 in Fig. 7 on its upper face and in this slot the square portion 115 of the arm 116 (Figs. 7 and 9) slides. The arm 116 is connected by means of the screw 117 with the carrier 11. The instrumentalities described including the screw 117, arm 116, square portion 115, slot 114, slide 112 and roller 111 permit of a very fine adjustment of the tool carrier 11 and the tool to set the tool to proper depth and take up for wear, the cam 110 being a relatively fixed part with relation to which the carrier 11 is adjusted by the instrumentalities described. After the adjustment has been made, the slide 112 is reclamped to the carrier 11 by turning the lever 118, to thread up the T-bolt 119 to clamp the slide and carrier together. A slot 119' through which the shank of the T-bolt passes is provided in the slide 112 so that the described adjustment can be made when the T-bolt is loosened up.

The cam 110 is so constructed as to feed the tool toward the blank during oscillation of the cradle in one direction and impart a further feed during the movement of the cradle in the opposite direction for providing a finishing cut; when the tooth side or sides being operated upon have been completely generated, the cam 110 withdraws the tool clear of the blank so that the blank can be indexed. The mounting of the feed cam 110 and the generating cam 80 upon the same shaft simplifies the drive and makes possible a more sturdy and rigid construction.

In a machine constructed according to the present invention, a universal or worm and worm wheel type index mechanism is provided. The same worm and worm wheel can be employed to index all tooth numbers of gears by simply changing the change gears in the index drive. With the present invention, the index worm and wheel are actuated from a source of power carried on the blank head or carrier, thereby avoiding the very complicated drive which would otherwise be necessary because of the oscillating movement of the cradle upon which the blank is mounted. During the cutting operation, the worm and worm wheel are stationary thereby locking the blank spindle 50 against movement relative to the sleeve 51 so that the blank spindle moves with this sleeve and partakes of the rolling movement of the gear segment 58 which is secured to the sleeve. In the mechanism illustrated, a ratchet wheel is driven continuously from a motor mounted upon the blank head or carrier and periodically this ratchet wheel is operatively connected with the worm and worm wheel to rotate the blank spindle relative to the sleeve 51 and the segment 58, thereby indexing the blank. The pawl which, by its engagement with the ratchet wheel, causes this periodic operative connection of the motor and worm and worm wheel is held out of engagement with the ratchet wheel during cutting by a locking dog which is tripped and released periodically through the relative movement of the segment arm 55 with relation to the cradle 13.

The index worm wheel 120 is keyed to the blank spindle 50 (Fig. 4) and is adapted to be rotated by the worm 121 which meshes therewith and is journaled in bearings in the housing or guard 119. The arm 55 is provided with an extension or bracket like portion upon which the motor 122 is mounted. The armature shaft of the motor carries a worm 123 which meshes with a worm wheel 124 (Figs. 4 and 5). The worm wheel 124 is connected with a ratchet wheel 125 and serves to rotate this ratchet wheel 125 continuously. The worm wheel and ratchet wheel are mounted so as to rotate upon a shaft 126 which is journaled in suitable bearings in the bracket-like extension of the arm 55. Secured to this shaft 126 is a stop plate 127 which surrounds the ratchet wheel 125 and which is coaxial therewith. This stop plate 127 is provided with a circumferential slot 128 within which is pivoted a pawl 129 which is adapted to engage the ratchet wheel at predetermined intervals to transmit the power of the motor 122 to the index worm and wheel 121, 120.

The pawl 129 is held out of engagement with the ratchet wheel during cutting by means of a dog 130 which is keyed to the pivotal shaft 131. This dog is provided with a ledge portion, shown clearly in Figure 4, which engages a lug portion formed on the pawl. The ledge portion of the dog serves simultaneously, also, to prevent rotation of the stop-plate in one direction. Rotation of the stop-plate in the opposite direction is prevented by means of a second dog 132 (Fig. 5) which engages with a shoulder formed on the periphery of the stop plate. The second dog 132 is keyed also to the pin 131. The two dogs 130 and 132 are normally pressed into position, where they will engage the stop plate to prevent rotation thereof in opposite directions and where the dog 130 will engage the pawl 129 holding it out of engagement with the ratchet wheel 125, by means of two springs 133 and 134. A spring pressed plunger 135 serves to urge the pawl 125 into engagement with the ratchet wheel against the withholding action of the dog 130.

Secured to the sleeve of the stop plate 127 and rotatable therewith is a spur gear 137 which meshes with a pinion 138 mounted upon a quadrant 139 and meshing in turn with a spur gear 140 (Fig. 1) which is secured to the shaft of the worm 121 that drives the index worm wheel 120.

As will be seen, the ratchet wheel 125 is rotated continuously from the motor 122 through the worm 123 and worm wheel 124; when the pawl 129 is released, the spring plunger 135 actuates it into engagement with the ratchet wheel whereby the stop plate 127 is rotated and with it the gears 137, 138, and 140 thereby rotating the worm 121 and worm wheel 120 to impart a relative movement between the blank spindle 50 and the sleeve 51 to index the blank. The gears 137, 138 and 140 form a set of change gears and may be changed to index for various tooth numbers to be cut.

During cutting, as stated, the stop plate 127 is held against rotation and the pawl 129 held out of engagement with the ratchet wheel 125 by dogs 130 and 132. The dogs are tripped or released when the cradle and blank reach a predetermined position to permit indexing. The trip mechanism will now be described.

Adjustably mounted on the cradle is an arm 142 (Figs. 4 and 6) which carries a roller 143 which is mounted upon a stud that is adjustable in a curved slot in the arm 142. As stated above, the dogs 130 and 132 are keyed to a pin or shaft 131. Secured to this shaft is an arm 145 which carries a roller 146 that contacts with the inclined outer face of an arm 147 which is secured to a rock-shaft 148. (Figs. 4 and 5.) This rock shaft 148 has secured at its outer end an arm 149 which has an outwardly projecting lug or ledge 150 which is adapted to engage the roller 143, already mentioned, during the movement of the segment arm 56 and sleeve 64 connected thereto relative to the cradle 13 and the arm 142 and the roller 143 carried thereby.

As the segmental arm and the parts supported by the bracket like extension thereof move in one direction the ledge 150 on the arm 149 passes idly over the roller 143; as the segment arm and the parts carried thereby move in the opposite direction, the ledge or lug 150 passes under the roller 143 and is forced downwardly rocking the shaft 148 which through the arm 147 rocks the roller 146 and the arm 145 to move the pin or shaft 131 on its axis thereby withdrawing the dogs 130 and 132 from engagement with the stop plate and simultaneously releasing the pawl 129 which is instantaneously engaged with the ratchet wheel 129 under actuation of the spring pressed plunger 135. When the pawl engages the ratchet wheel the rotation of the ratchet wheel is transmitted to the stop plate 127 and through the gears 137, 138 and 140 to the worm shaft and the worm 121 mounted thereon rotating the index wheel 120 and moving the blank spindle 50 relative to the sleeve 51 and segment 58 indexing the blank.

To give sufficient time for the indexing operation and to insure the accuracy thereof, an auxiliary means is provided for withholding the dogs 130 and 132 from returning to locking engagement with the stop plate 127 until the stop plate has made a plurality of revolutions. For this purpose, a half-slotted shaft 152 is provided (Figs. 4 and 5). This shaft 152 is slotted diametrally across for a considerable portion of its length and is rotated only during indexing, being actuated from the shaft 126 through the gears 154 and 155. This shaft 152 is so positioned that during its rotation from the position shown in Figures 4 and 5 and until it returns to that position it will engage the free end of the dogs 130 and 132 and prevent these dogs from returning into engagement with the stop plate 127 and the pawl 129, under actuation of the springs 133 and 134. The gears 154 and 155 may be selected to give any desired number of rotations of the stop plate for indexing to one rotation of the shaft 152, whereby the dogs 130 and 132 can be held out of locking position for any desired period. In the mechanism shown, the gear ratio of gear 154 to that of gear 155 is 1 to 2 so that the stop plate makes two revolutions during indexing before it is again locked up.

The shafts 126 and 152, the motor 122 and all the parts of the indexing mechanisms described are mounted upon the bracket-like extension of the arm 55 and move with this arm as it is rolled during the operation of the machine by the rolling motion of the segment 58 upon the segment 59. The trip roller 143 can be adjusted to any position upon the arm 142 and secured therein and the arm 142 can be adjusted into any position upon the face of the cradle and secured thereto, as by means of the bolt 156 which engages in a T-slot 157 formed in the face of the cradle. These two adjustments permit of setting the roller 143 to trip the index mechanism at the proper time in the roll.

The operation of the machine will be evident from what has preceded, but may be briefly summed up here. The tool is adjusted into position for cutting teeth of the proper spiral angle upon the blank by the adjusting screws 16 and 26 which effect horizontal and vertical adjustments of the tool. The tool may then be tilted to the proper pressure angle by threading on the screws 32 (Fig. 2) thus effecting an angular adjustment of the tool saddle. If a depthwise adjustment of the tools is required this may be effected by means of the screw 117 and the cam roller 111 (Fig. 7). The pitch angle of the gear to be cut being known, a gear segment 58 of a suitable pitch angle is selected and secured to the arm 55 by means of the bolts 160. The blank head or carrier 14 is then adjusted on the cradle to bring the root line of a tooth of the blank onto the center line of the machine. The sleeve 51 and the blank spindle may be adjusted axially by means of the screw 53 (Fig. 8) which is mounted in the bearing 54 of the segment arm 55 and which threads into a nut 161 secured in the sleeve, to bring the blank apex into the proper position. The machine may then be started up. The tool will then be rotated continuously from the motor 90 through the gearing already described. The worm 123 (Figs. 4 and 5) and the worm wheel 124 and the ratchet wheel 125 will be rotated continuously from the motor 122. The clutch 95 being in engaged position, the motor 90 drives through the gearing already described the cam shaft 86 rotating the cams 110 and 80 continuously in the same direction. The rotation of the cam 80 imparts an oscillatory motion to the cradle 13 and a rolling motion between the tool and blank through the instrumentality of the segments 58 and 59. When a tooth side or tooth sides have been completely generated the tool is withdrawn from engagement with the blank by the cam 110 and when the tool is clear of the blank the index mechanism is tripped by means of the roller 143 and the arm 149 to release the pawl 129 and the stop plate 127 and permit transmission of the rotation of the ratchet wheel 125 to the worm wheel 120 thereby producing a relative movement between the blank spindle 50 and the sleeve 51 to index the blank. The cam 110 is so constructed as to withhold the tool out of engagement with the blank for sufficient period to permit indexing and then to return the tool into engagement for cutting the next tooth face or space.

When the blank has been completed the tool mechanism is withdrawn entirely clear of the blank to permit the now finished gear to be taken off and a new blank substituted therefor. The tool mechanism may thus be completely withdrawn by rotation of the shaft 165 (Figs. 1, 2 and 7) which is journaled in the tool carrier 11 and which carries a pinion 166 that meshes with a rack 167 secured upon the bed or frame of the machine. To permit of this complete withdrawal of the tool mechanism away from the blank, the cam 111 (Fig. 7) is provided with a slot 168 through which the cam roller 111 can pass.

To prevent accidental disengagement of the cam roller from the cam while the machine is still in operation, a safety device is provided which constitutes one of the novel features of the mechanism illustrated. This safety device comprises a hand operated draw-rod 170 which is pivotally connected at 171 with the arm 172 which is pivotally mounted upon a stud 173 in the bed or frame. The arm 172 carries a roller 174 which when the machine is operating is aligned with the slot 168 in the cam 110 and prevents the roller 111 from being withdrawn from that slot.

The arm 172 has formed integral with it a short arm 175 (Figs. 2 and 7) which is provided with a cam slot 176 and in which engages a roller 177. This roller 177 is secured to an arm 178 which is fastened to an arm 179 that is fastened to the yoke member 180. The yoke member is pivoted upon the stud 181 and carries rollers which engage in a peripheral groove formed in the slidable member 182 of the clutch 95. This slidable member of the clutch slides on a sleeve formed integral with the gear 94.

When the arm 172 and roller 174 are in the position shown in Figures 2 and 7 the tool carrier 11 cannot be moved clear of the blank because the cam roller 111 cannot be withdrawn from the slot 168 of the cam 110. To permit withdrawing of the roller from the cam the draw-bar 170 must be pulled by the operator to shift the roller 174 out of alignment with the slot 168. When this is done the arm 175 is rocked about its pivot 173 causing the cam slot 176 in this arm to move the arm 178 downwardly and rock the yoke 180 about its pivot 181 to disengage the sliding member of the clutch from the fixed member thereof thus stopping the drive of the machine. The instrumentalities just described afford, therefore, a safety device preventing accidental withdrawal of the tool mechanism entirely clear of the blank while the machine is operating.

While the invention has been described in connection with a particular embodiment and in connection with a particular use for such an embodiment, it will be understood that the invention is capable of further modification and use within its scope and that this application is intended to cover any variations, uses or adaptations of the invention following, in general, the principles of the invention and including such departures from the present disclosure as come within known or customary practice in the gear art and may be applied to the essential features hereinbefore set forth and as fall within the scope of the appended claims.

Having thus described our invention, what we claim is:

1. The method of generating the teeth of a bevel gear which consists in connecting to a blank a bevel gear segment having a pitch angle less than that of the blank to be cut and rolling said segment on a yieldable crown gear segment having a fixed relation to the tool mechanism and having a pitch angle of 90° and imparting a cutting movement to the tool during such rolling motion.

2. The method of generating the teeth of a bevel gear which consists in connecting to a blank a bevel gear segment having a pitch angle less than that of the blank to be cut and rolling said segment on a relatively stationary but yieldably mounted crown gear segment having a pitch angle of 90° and imparting a cutting motion to a tool during such rolling motion.

3. The method of generating the teeth of a bevel gear which consists in rotating an annular face mill in engagement with a blank while producing a relative rolling motion between tool and blank by means of a bevel gear segment connected to the blank and having a pitch angle less than that of the blank and rolling on a relatively stationary but yieldably mounted crown gear segment having a pitch angle of 90°.

4. The method of generating the teeth of a bevel gear which consists in connecting to a blank a bevel gear segment having a pitch angle less than that of the blank to be cut and rolling said segment on a yieldably mounted crown gear segment having a fixed relation to the tool mechanism and having a pitch angle of 90° and rotating an annular face mill in engagement with the blank during such rolling motion.

5. The method of generating the teeth of a bevel gear which consists in adjusting a blank with the root line of a tooth in the plane of the tip surface of the tool and imparting a relative rolling movement between the tool and blank about an axis perpendicular to said plane by connecting to the blank a bevel gear segment having a pitch angle less than that of the blank and rolling said segment on a yieldably mounted crown gear segment having a fixed relation to the tool mechanism and having a pitch angle of 90° and imparting a cutting movement to the tool during said rolling motion.

6. The method of generating the teeth of a bevel gear which consists in employing a rotary annular face mill, adjusting the blank with the root line of a tooth in the plane of the tip surface of the tool and imparting a relative rolling movement between the tool and blank about an axis parallel to the tool axis by connecting to the blank a bevel gear segment having a pitch angle less than that of the blank and rolling said segment on a yieldably mounted crown gear segment having a fixed relation to the tool mechanism and having a pitch angle of 90° while rotating the face mill in engagement with the blank.

7. The method of generating the teeth of a bevel gear which consists in adjusting the blank with the root line of a tooth in the plane of the tip surface of the tool, and imparting a relative rolling movement between the tool and blank about an axis perpendicular to said plane by connecting to the blank a bevel gear segment having a pitch angle less than that of the blank and rolling said segment on a relatively stationary but yieldably mounted crown gear segment having a pitch angle of 90° and imparting a cutting movement to the tool during such rolling movement.

8. The method of generating the teeth of a bevel gear which consists in employing a rotary annular face mill, adjusting the blank with the root line of a tooth in the plane of the tip surface of the tool and imparting a relative rolling movement between the tool and blank about an axis parallel to the axis of the tool by connecting to the blank a bevel gear segment having a pitch angle less than that of the blank and rolling said segment on a stationary but yieldably mounted crown gear segment having a pitch angle of 90° while rotating the tool in engagement with the blank.

9. In a bevel gear generating machine, a tool, a blank support, a bevel gear segment connected to the blank support and having a pitch angle less than that of the blank, a yieldably mounted crown gear segment having a fixed relation to the tool and having a pitch angle of 90°, means for rolling the first segment on the second to effect a relative rolling motion between tool and blank and means for imparting a cutting movement to the tool during said rolling motion.

10. In a bevel gear generating machine, a blank support, a rotary annular face mill, a bevel gear segment connected to the blank support and having a pitch angle less than that of the blank, a yieldably mounted crown gear segment having a fixed relation to the tool and having a pitch angle of 90°, means for rolling the first segment on the second to effect a relative rolling motion between the tool and blank, and means for rotating the tool on its axis during said rolling movement.

11. In a bevel gear generating machine, a tool, a blank support, a bevel gear segment connected to the blank support and having a pitch angle less than that of the blank, a relatively stationary but yieldably mounted crown gear segment having a pitch angle of 90° and means for rolling the first segment on the second to effect a relative rolling motion between the tool and blank and means for imparting a cutting movement to the tool during said rolling motion.

12. In a bevel gear generating machine, a blank support, a rotary annular face mill, a bevel gear segment connected to the blank support and having a pitch angle less than that of the blank, a relatively stationary but yieldably mounted crown gear segment having a pitch angle of 90°, means for rolling the first segment on the second to effect a relative rolling motion between tool and blank and means for rotating the tool on its axis in engagement with the blank during said rolling motion.

13. In a bevel gear generating machine, a tool, a blank support, means for adjusting the blank support so that the root line of a tooth may lie in the plane of travel of the tip surface of the tool, means for producing a relative rolling movement between the tool and blank about an axis perpendicular to said plane comprising a bevel gear segment connected to the blank support and having a pitch angle less than that of the blank, a yieldably mounted crown gear segment having a pitch angle of 90° and having a fixed relation to the tool, and means for rolling the first segment on the second and means for imparting a cutting movement to the tool during said rolling motion.

14. In a bevel gear generating machine, a rotary annular face mill, a blank support, means for adjusting the blank support so that the root line of a tooth of the blank may lie in the plane of the tip surface of the tool, means for rotating the tool on its axis in engagement with the blank, and means for simultaneously producing a relative rolling motion between tool and blank about an axis perpendicular to said plane comprising a bevel gear segment connected to the blank support and having a pitch angle less than that of the blank, a yieldably mounted crown gear segment having a pitch angle of 90°, and means for rolling the first segment on the second.

15. In a bevel gear generating machine, a tool, a blank support, means for adjusting the blank support so that the root line of a tooth of the blank may lie in the plane of travel of the tip surface of the tool, means for imparting a cutting movement to the tool, and means for simultaneously producing a relative rolling motion between the tool and blank about an axis perpendicular to said plane comprising a bevel gear segment connected to the blank support and having a pitch angle less than that of the blank, a relatively stationary but yieldably mounted crown gear segment having a pitch angle of 90°, and means for rolling the first segment on the second.

16. In a bevel gear generating machine, a rotary annular face mill, a blank support, means for adjusting the blank support so that the root line of a tooth of the blank may lie in the plane of travel of the tip surface of the tool, means for rotating the tool in engagement with the blank, and means for simultaneously producing a relative rolling motion between the tool and blank about an axis perpendicular to said plane comprising a bevel gear segment connected to the blank support and having a pitch angle less than that of the blank, a relatively stationary but yieldably mounted crown gear segment having a pitch angle of 90° and means for rolling the first segment on the second.

17. In a gear generating machine, a blank support, a tool support, a tool mounted on said tool support, an oscillatory carrier upon which one of said supports is mounted, a tapered gear segment connected to the blank support and having a pitch angle less than that of the blank, a slidably mounted crown gear segment having a fixed relation to the tool and having a pitch angle of 90°, means for moving said carrier on its axis and means for imparting a cutting movement to the tool.

18. In a bevel gear generating machine, a blank support, a tool support, an oscillatory carrier upon which said blank support is mounted, means for adjusting the blank support so that the axis of the blank intersects the axis of said carrier, a tapered gear segment connected to the blank support and having a pitch angle less than that of the blank, a relatively fixed slidably mounted crown gear segment having a pitch angle of 90°, means for oscillating said carrier on its axis and means for imparting a cutting movement to the tool.

19. In a bevel gear generating machine, a blank support, a tool support, means for adjusting the blank support so that the root line of a tooth of the blank lies in the plane of travel of the tip surface of the tool, an oscillatory carrier, upon which one of said supports is mounted, mounted for movement about an axis perpendicular to said plane, a bevel gear segment connected to the blank support and having a pitch angle less than that of the blank, a slidably mounted crown gear segment having a fixed relation to the tool and having a pitch angle of 90°, means for moving said carrier on its axis and means for imparting a cutting movement to the tool.

20. In a bevel gear generating machine, a blank support, a tool support, a tool mounted thereon, means for adjusting the blank support so that the root line of a tooth of the blank lies in the plane of travel of the tip surface of the tool, an oscillatory carrier upon which the blank support is mounted, a bevel gear segment connected to the blank support and having a pitch angle less than that of the blank, a slidably mounted relatively stationary crown gear segment having a pitch angle of 90°, means for moving said carrier on its axis, and means for imparting a cutting movement to the tool.

21. In a bevel gear generating machine, a blank support, a tool support, a rotary annular face mill mounted thereon, means for adjusting the blank support so that the root line of a tooth of the blank lies in the plane of the tip surface of the tool, an oscillatory carrier, upon which one of said supports is mounted, movable about an axis parallel to the axis of the tool, a bevel gear segment connected to the blank support and having a pitch angle less than that of the blank, a slidably mounted crown gear segment having a fixed relation to the tool and having a pitch angle of 90°, means for moving the carrier on its axis and means for rotating the tool on its axis in engagement with the blank.

22. In a bevel gear generating machine, a blank support, a tool support, a rotary annular face mill mounted thereon, means for adjusting the blank support so that the root line of a tooth of the blank lies in the plane of the tip surface of the tool, an oscillatory carrier upon which said blank support is mounted, rotatable about an axis parallel to the axis of the tool, a bevel gear segment connected to the blank support and having a pitch angle less than that of the blank, a relatively stationary slidably mounted crown gear segment having a pitch angle of 90°, means for moving said carrier on its axis and means for rotating the tool in engagement with the blank.

23. In a bevel gear generating machine, a blank support, a tool support, a tool mounted thereon, means for adjusting the blank support so that the root line of a tooth of the blank lies in the plane of travel of the tip surface of the tool, an oscillatory carrier upon which said blank support is mounted, movable about an axis perpendicular to said plane, a bevel gear segment connected to the blank support and having a pitch angle less than that of the blank, a relatively stationary crown gear segment meshing with the first segment and having a pitch angle of 90°, said stationary segment including a plurality of yieldable sections, means for moving the carrier on its axes and means for imparting a cutting movement to the tool.

24. In a bevel gear generating machine, a blank support, a tool support, a rotary annular face mill mounted thereon, means for adjusting the blank support so that the root line of a tooth of the blank lies in the plane of the tip surface of the tool, an oscillatory carrier upon which the blank support is mounted, movable about an axis parallel to the axis of the tool, a bevel gear segment connected to the blank support and having a pitch angle less than that of the blank, a relatively stationary crown gear segment meshing with the first segment and having a pitch angle of 90°, said stationary segment including a plurality of yieldable sections, means for moving the carrier on its axis and means for rotating the tool in engagement with the blank.

25. In a bevel gear generating machine, a blank support, a tool support, a tool mounted thereon, means for adjusting the blank support so that the root line of a tooth of the blank lies in the plane of travel of the tip surface of the tool, an oscillatory carrier upon which the blank support is mounted, movable about an axis perpendicular to said frame, a bed upon which the tool support is slidable in a direction parallel to the axis of said carrier, a bevel gear segment connected to the blank support and having a pitch angle less than that of the blank, a relatively stationary but yieldably mounted crown gear segment meshing with the first segment and having a pitch angle of 90°, a rotary cam shaft having a pair of cams mounted thereon, one for oscillating said carrier and the other for effecting a movement of the tool support toward and from the blank, means for rotating the cam shaft and means for imparting a cutting movement to the tool.

26. In a bevel gear generating machine, a blank support, a tool support, a rotary annular face mill mounted thereon, means for adjusting the blank support so that the root line of a tooth of the blank lies in the plane of the tip surface of the tool, an oscillatory carrier upon which the blank support is mounted, movable about an axis perpendicular to said plane, a bed upon which the tool support is slidable in a direction parallel to the axis of said carrier, a bevel gear segment connected to the blank support and having a pitch angle less than that of the blank, a relatively stationary crown gear segment meshing with the first segment and having a pitch angle of 90° said stationary segment including a plurality of yieldable sections, a rotary cam shaft having a pair of cams mounted thereon, one for oscillating said carrier and the other for effecting movement of said tool support toward and from the blank, means for rotating the cam shaft and means for rotating the tool in engagement with the blank.

27. In a gear generating machine, a tool mechanism, a blank carrier, a blank spindle rotatably mounted on said carrier, gearing mounted wholly on said carrier for periodically imparting a rotary indexing movement to said blank spindle, actuating means mounted on said carrier for rotating said gearing, said means being disconnected from said gearing during cutting, means for imparting a relative rolling movement between the tool mechanism and blank carrier and means whereby said rolling motion automatically enables operative connection of said actuating means with said gearing periodically to permit indexing the blank.

28. In a gear generating machine, a tool mechanism, a blank carrier, a blank spindle rotatably mounted on said carrier, a worm wheel secured to said spindle, a worm journaled in said blank carrier for actuating said wheel, means including a source of power mounted on said carrier for actuating said worm, said means being in inoperative relation to the worm during cutting, means for imparting a relative rolling movement between the tool mechanism and blank carrier and means whereby said rolling motion automatically enables operative connection of said actuating means with said worm periodically to permit indexing of the blank.

29. In a gear generating machine, a tool carrier, tool mechanism mounted thereon, a blank carrier, a sleeve journaled in said carrier, a blank spindle rotatably mounted in said sleeve, an oscillatory cradle upon which one of said carriers is mounted, a worm wheel secured to said blank spindle and a worm journaled in the blank carrier for rotating the same to impart a relative movement between the sleeve and spindle to index the blank, actuating means including a source of power mounted wholly on said work carrier for rotating said worm, locking means preventing rotation of the worm during cutting, means for rotating said sleeve and simultaneously oscillating said cradle, and means whereby the rotary motion of said sleeve acts automatically to release said locking means at predetermined intervals to permit operative connection of said actuating means and worm to index the blank.

30. In a gear generating machine, a tool mechanism, a blank carrier, a sleeve journaled in said carrier, a blank spindle rotatably mounted in said sleeve, an oscillatory cradle upon which said carrier is mounted, a worm wheel secured to said spindle and a worm journaled in said carrier for rotating the same to impart a relative movement between the sleeve and spindle to index the blank, locking means preventing rotation of the worm during cutting, means for oscillating said sleeve and said cradle, means carried by the cradle for releasing said locking means at predetermined intervals and means, including a source of power, mounted wholly on said carrier for rotating said worm when the locking means is released to index the blank.

31. In a gear generating machine, a tool carrier, a blank carrier, an oscillatory cradle on which one of said carriers is mounted, a blank spindle journaled in said blank carrier, a gear segment normally fixedly connected to the blank spindle, a second gear segment meshing with the first segment and having a fixed relation to the tool, a worm and worm wheel for imparting a relative movement between the blank spindle and the first segment periodically to index the blank, means including a source of power mounted wholly on the blank carrier for rotating said worm and wheel, means for locking the worm and wheel against rotation during cutting, means for oscillating said cradle and means operating automatically to release said locking means when the cradle reaches a predetermined position.

32. In a gear generating machine, a tool mechanism, a blank carrier, an oscillatory cradle upon which said blank carrier is mounted, a sleeve journaled in said carrier, a blank spindle rotatably mounted in said sleeve, a gear segment fixedly connected to said sleeve, a relatively stationary gear segment on which the first segment rolls, a worm and worm wheel for periodically imparting a relative movement between the blank spindle and sleeve to index the blank, said worm wheel being secured to the blank spindle and said worm being mounted on the blank carrier, means including a source of power mounted wholly on the blank carrier for rotating said worm and wheel, means for locking the worm and wheel against rotation during cutting, means for oscillating said cradle and means carried by the cradle and acting automatically to effect release of said locking means to permit indexing of the blank when the cradle reaches a predetermined position.

33. In a gear generating machine, tool mechanism, a blank carrier, a blank spindle rotatably mounted thereon, means for rolling the blank carrier bodily to generate the tooth profiles, gearing for periodically rotating the blank spindle to index the same, a rotary member, means including a source of power mounted wholly on the blank carrier for continuously rotating said member, means for locking said gearing against movement during cutting, and means whereby said rolling movement automatically releases said locking means at pretermined intervals and simultaneously connects said continuously rotating member to said train of gearing to index the blank.

34. In a gear generating machine, tool mechanism, a blank carrier, an oscillatory cradle upon which said carrier is mounted, a sleeve journaled in said blank carrier, a blank spindle rotatably mounted in said sleeve, a gear segment connected to said sleeve, a relatively stationary gear segment on which the first segment rolls, a worm and worm wheel for rotating the blank spindle relative to the sleeve to periodically index the blank, said worm wheel being secured to said spindle and said worm being journaled in said carrier, a rotary member, means including a source of power mounted wholly on the blank carrier for continuously rotating said member, a ratchet and pawl mechanism, one member of which is connected to said continuously rotating member and the other member of which is operatively related to said worm, means constantly urging the pawl into engagement with the ratchet wheel, locking means with-holding said pawl from engagement with said ratchet wheel during cutting, means for oscillating said cradle, and means carried by said cradle for releasing said locking means when the cradle reaches a predetermined position to permit operative connection of the continuously rotating member with the worm to index the blank.

35. In a gear generating machine, a tool mechanism, a blank carrier, an oscillatory cradle upon which said carrier is mounted, a sleeve journaled in said blank carrier, a blank spindle rotatably mounted in said sleeve, a gear segment connected to said sleeve, a relatively stationary gear segment on which the first segment rolls, a worm and worm wheel for rotating the blank spindle relative to the sleeve to periodically index the blank, said worm wheel being secured to said spindle and said worm being journaled in said carrier, a rotary member, means including a source of power mounted wholly on the blank carrier for continuously rotating said member, a ratchet and pawl mechanism, one member of which is connected to said continuously rotating member and the other member of which is operatively related to said worm, means constantly urging the pawl into engagement with the ratchet wheel, locking means with-holding said pawl from engagement with said ratchet wheel during cutting, means for oscilating said cradle, and means carried by said cradle for releasing said locking means when the cradle reaches a predetermined position to permit operative connection of the continuously rotating member with the worm to index the blank, and means controlling said locking means when released to maintain the same in released position during a predetermined integral number of turns of said ratchet wheel.

36. In a machine for cutting gears, a tool carrier, a blank carrier, a main drive shaft for actuating the machine, a clutch adapted to connect said shaft with a source of power, means for moving one of said carriers away from the other after completion of the blank to permit removal of the blank from the machine and a safety device preventing said movement until said clutch has been disengaged.

37. In a machine for cutting gears, a tool carrier, a blank carrier, one of which is movable toward and from the other to permit cutting and indexing, means for effecting said movement including a cam roller carried by one of said supports and a cam engaged thereby, separate means for moving said support after the operation on the blank has been completed to effect complete relative withdrawal between the tool and blank to permit removal of the blank from the machine, said cam being provided with a slot to permit passage of the roller therethrough during the last named movement, a main drive shaft for actuating the machine, a clutch adapted to connect said shaft with a source of power and a safety device connected to said clutch preventing movement of said roller from said slot until said clutch has been disengaged.

38. In a gear generating machine, tool mechanism, a blank carrier, an oscillatory cradle upon which said carrier is mounted, a sleeve journaled in said blank carrier, a blank spindle rotatably mounted in said sleeve, a gear segment connected to said sleeve, a relatively stationary gear segment on which the first segment rolls, a worm wheel secured to the blank spindle, a worm journaled in said carrier and meshing with said worm wheel, a rotary member, means including a source of power mounted wholly on the blank carrier for continuously rotating said member, means preventing operative connection of the rotary member with the worm during cutting, means for oscillating the cradle, and means operated by the relative movement between the cradle and sleeve to trip said locking means at a predetermined point in the cradle movement to permit connection of the rotary member with the worm to rotate the worm and worm wheel to index the blank spindle periodically.

JAMES E. GLEASON.
EYVIND FINSEN.
RAYMOND WEBSTER.